(12) United States Patent
Kadoi (10) Patent No.: US 7,171,590 B2
(45) Date of Patent: Jan. 30, 2007

(54) MULTI-PROCESSOR SYSTEM THAT IDENTIFIES A FAILED NODE BASED ON STATUS INFORMATION RECEIVED FROM SERVICE PROCESSORS IN A PARTITION

(75) Inventor: Tadashige Kadoi, Tokyo (JP)

(73) Assignee: NEC Corporation, Tokyo (JP)

( * ) Notice: Subject to any disclaimer, the term of this patent is extended or adjusted under 35 U.S.C. 154(b) by 622 days.

(21) Appl. No.: 10/627,740

(22) Filed: Jul. 28, 2003

(65) Prior Publication Data
US 2004/0153888 A1    Aug. 5, 2004

(30) Foreign Application Priority Data
Jul. 29, 2002    (JP)    .............................. 2002-220125

(51) Int. Cl.
*G06F 11/00*    (2006.01)
(52) U.S. Cl. .............................. 714/48; 714/4; 714/10; 709/223; 709/224
(58) Field of Classification Search ................... 714/4, 714/48
See application file for complete search history.

(56) References Cited

U.S. PATENT DOCUMENTS

| | | | | |
|---|---|---|---|---|
| 5,694,550 A | * | 12/1997 | Takeda et al. ............... | 709/226 |
| 6,711,700 B2 | * | 3/2004 | Armstrong et al. ........... | 714/23 |
| 6,842,870 B2 | * | 1/2005 | Austen et al. ................ | 714/48 |
| 7,007,192 B2 | * | 2/2006 | Yamazaki ...................... | 714/5 |
| 2002/0194371 A1 | * | 12/2002 | Kadoi ........................ | 709/239 |
| 2004/0153888 A1 | * | 8/2004 | Kadoi ........................ | 714/57 |

FOREIGN PATENT DOCUMENTS

| JP | 2001034587 A | * | 2/2001 |
|---|---|---|---|
| JP | 2001-134546 | | 5/2001 |

* cited by examiner

*Primary Examiner*—Robert Beausoliel
*Assistant Examiner*—Emerson Puente
(74) *Attorney, Agent, or Firm*—McGinn Law Group, PLLC (57) ABSTRACT

A multi-processor system includes a partition including a selected number of nodes selected from a plurality of nodes provided in a plurality of node groups, each of the nodes including a computer. A failed node in the partition notifies a failure to a corresponding service processor of the node group and other nodes of the partition. The corresponding service processor and the service processors managing the other nodes notify the error log information to a service processor manager, which identifies the location of the failure and indicate the service processors to recover from the failure.

9 Claims, 9 Drawing Sheets

MULTI-PROCESSOR SYSTEM THAT IDENTIFIES A FAILED NODE BASED ON STATUS INFORMATION RECEIVED FROM SERVICE PROCESSORS IN A PARTITION

BACKGROUND OF THE INVENTION (a) Field of the Invention

The present invention relates to a multi-processor system and, more particularly, to an improvement of the processing for recovering from a failure in the multi-processor system.

(b) Description of the Related Art

In a recent multi-processor system, especially in an open multi-processor system such as running thereon Windows and Unix (trade marks), there is a tendency for enhancing the remote access service (RAS) functions of the platform for controlling the system configurations, processing for error logging and recovery from a failure in association with the operating system, drivers and applications.

In the mean time, the system platform of the multi-processor system is increased in the scale thereof to meet diversification of the use needs, whereby there is also a demand for separating the multi-processor system into a plurality of partitions each capable of allowing independent system operation and running thereon a plurality of operating systems.

In the circumstances as described above, it is expected in the near future that a large-scale multi-processor system is separated into a plurality of partitions each meeting the requirements of the functions by which resources can be flexibly added thereto or removed therefrom depending on the loads in each of the partitions, and by which the failed resources can be immediately and automatically replaced with backup resources provided for this purpose in the system. It is also expected that the needs for a consolidated platform are increased wherein a plurality of multi-processor systems are consolidated to reduce the system costs.

It is generally important in a multi-processor system to deal with precise recovery from the system failure. Patent Publication JP-A-2001-134546, for example, describes a technique for processing of recovery from a failure in a multi-processor system wherein a single service processor controls a plurality of nodes.

However, the above publication is silent to the control of a consolidated multi-processor system having a plurality of node groups each including a plurality nodes, wherein a plurality of nodes belonging to different groups are selected to form an independent system. In such a system, the failure may extend over a plurality of node groups, and thus it is not assured to recover from the failure by using the technique described in the publication.

In view of the above problem of the conventional technique, it is an object of the present invention to provide a large-scale multi-processor system which is capable of immediately and assuredly recovering from a failure, the large-scale multi-processor system including a plurality of node groups, each of which includes a plurality of nodes and a service processor for controlling the plurality of nodes.

It is another object of the present invention to provide a method used in such a large-scale multi-processor system.

The present invention provides, in one aspect thereof, a multi-processor system including: a plurality of node groups each including a plurality of nodes and a service processor for managing the plurality of nodes; a service processor manager for managing the service processors of the plurality of node groups; a network for interconnecting the plurality of nodes of the plurality of node groups, and a partition including a selected number of is nodes selected from the plurality of nodes of the plurality of node groups, wherein: a failed node among the selected number of nodes transmits failure information including occurrence of a failure to a corresponding service processor, which prepares first status information of the failed node based on error log information of the failed node and transmits the first status information to the service processor manager; the failed node transmits failure notification data including the failure information to other nodes of the selected number of nodes; the other nodes transmit the failure information to respective the service processors, which prepare second status information based on error log information of the other nodes and transmit the second status information to the service processor manager; and the service processor manager identifies a location of the failed node based on the first and second status information to indicate the service processors in the partition to recover from the failure.

The present invention also provides a method for recovering from a failure in a multi-processor system including: a plurality of node groups each including a plurality of nodes and a service processor for managing the plurality of nodes; a service processor manager for managing the service processors of the plurality of node groups; a network for interconnecting the plurality of nodes of the plurality of node groups, and a partition including a selected number of nodes selected from the plurality of nodes of the plurality of node groups, the method including the steps of: transmitting failure information including occurrence of a failure from a failed node among the selected number of nodes to a corresponding service processor, thereby allowing the corresponding service processor to prepare first status information of the failed node based on error log information of the failed node and transmit the first status information to the service processor manager; transmitting failure notification data including the failure information from the failed node to other nodes of the selected number of nodes; transmitting the failure information from the other nodes to respective the service processors, thereby allowing the service processors to prepare second status information based on error log information of the other nodes and transmit the second status information to the service processor manager; and allowing the service processor manager to identify a location of the failed node based on the first and second status information and indicate the service processors in the partition to recover from the failure.

In accordance with the method and system of the present invention, since the service processor manager receives error log information of the respective nodes from the service processor managing the failed node and the service processors managing the other nodes belonging to the partition to which the failed node belongs, the service processor manager can correctly identify the location and state of the failure and thus allow the system to quickly and assuredly recover from the failure.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings.

Figure 1:
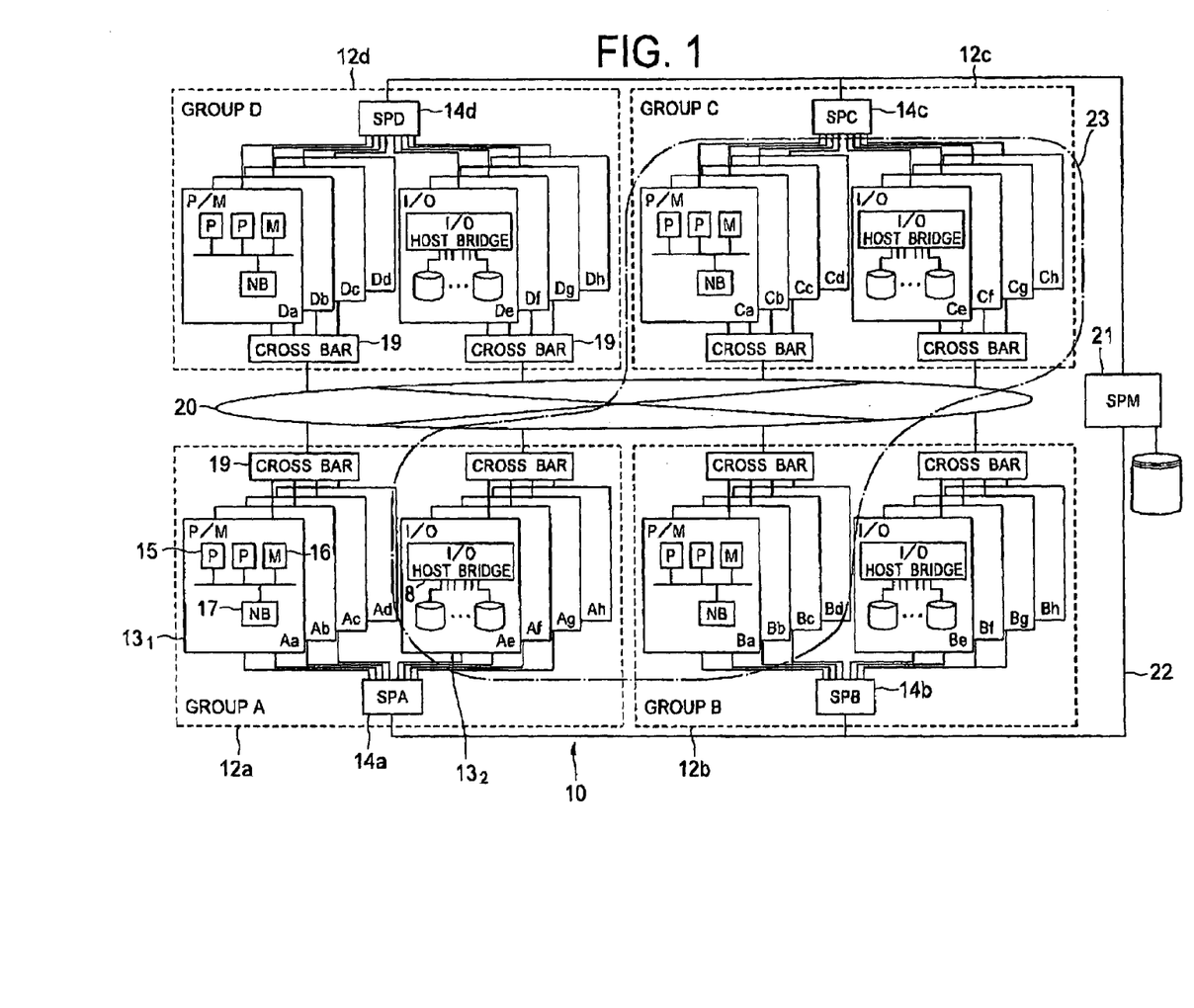
FIG. 1 is a block diagram of a multiprocessor system according to an embodiment of the present invention.

Referring to FIG. 1, a multi-processor system, generally designated by numeral 10, according to an embodiment of the present invention includes a plurality (four in this example) of node groups 12, i.e., node group-A to node group-D, a network 20, a service processor manager 21, and a dedicated communication line 22 for coupling together the service processor manager 21 and the service processors 14.

The plurality of node groups 12 may be located apart from one another or may be located adjacent to one another. If these node groups are located apart from one another, it means that the remote node groups can be used to form the single multi-processor system 10 based on the present embodiment.

Node group-A 12a includes a plurality of (eight in this example) nodes 13, nodes Aa to Ah, and a service processor for managing these nodes 13. The nodes 13 in node group-A 12a as well as other node groups include two types, P/M nodes $13_1$ and an I/O node $13_2$. Each of the other node groups 12, i.e., node group-B 12b to node group-D 12d, also include a plurality of nodes 13 and a service processor 14, similarly to node group-A 12a. It is to be noted that the numbers of node groups 12, nodes 13, node types, processors 15 and memories 16 as recited in the present embodiment are only examples, and may be any number so long as there are a plurality of node groups 12 each including a plurality of nodes 13.

The P/M node $13_1$ in each node group 12 operates mainly for arithmetic calculation and signal processing, and includes therein at least one processor 15, at least one memory 16 and a nose bridge 16 for coupling together the processor 15 and a bus for connecting the constituent elements in the P/M node $13_1$. The I/O node $13_2$ in each node group 12 operates for input/output of transmission data, and includes therein an I/o host bridge 18 and its subordinate I/O device (not shown).

The service processor 14 in each node group 12 connects the nodes 13 together in the each node group 12, and manages the nodes 13 in the each node group 12.

The thirty-two nodes 13 belonging to the four node groups 12 are interconnected via cross bars 19 provided in each node group 12 and a network 20 provided for interconnecting the node groups 12. The cross bar 19 has a function of dynamically selecting communication paths for transferring the data between the plurality of processors 15 and memories 16.

The service processor manager 21 is connected to the service processors 14 via the dedicated communication line 12 for management of the service processors 14.

In the configurations of the hardware platform as described above, a partition 23 is formed as an independent system by selecting any of a plurality of nodes 13 from any of a plurality of node groups 12. More specifically, the partition 23 is formed in this example by selecting node-Ae to node-Ah from node group-A, node-Ba to node-Bd from node group-B, and node-Ca to node-Ch from node group-C, to count total of sixteen nodes 13. It is to be noted that a plurality of partitions 23 may be formed, although a single partition 23 is exemplified in FIG. 1.

Figure 2:
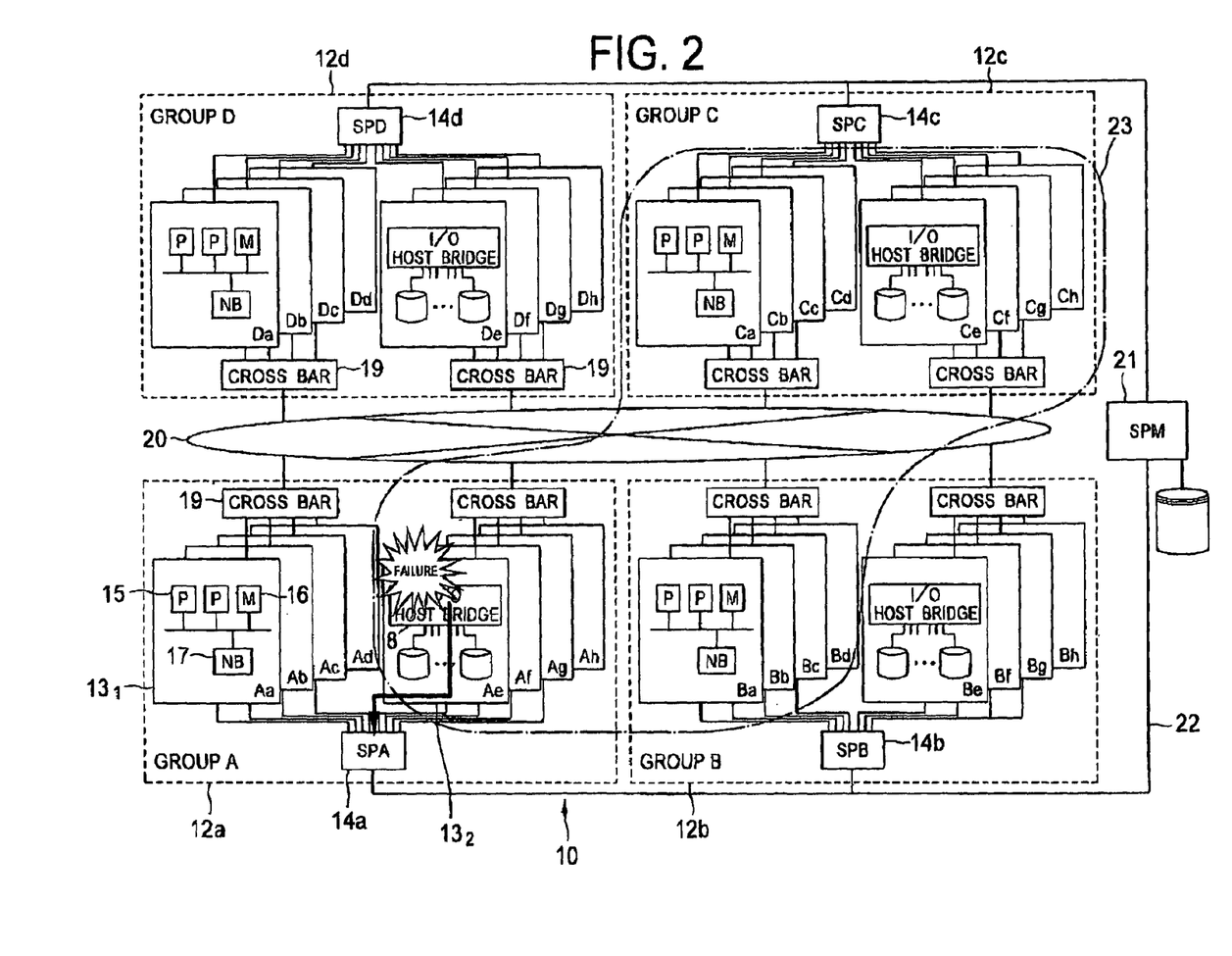
FIGS. 2 to 7 are block diagrams of the multi-processor system of FIG. 1, showing consecutive steps of processing for recovering from a failure.
Figure 6:
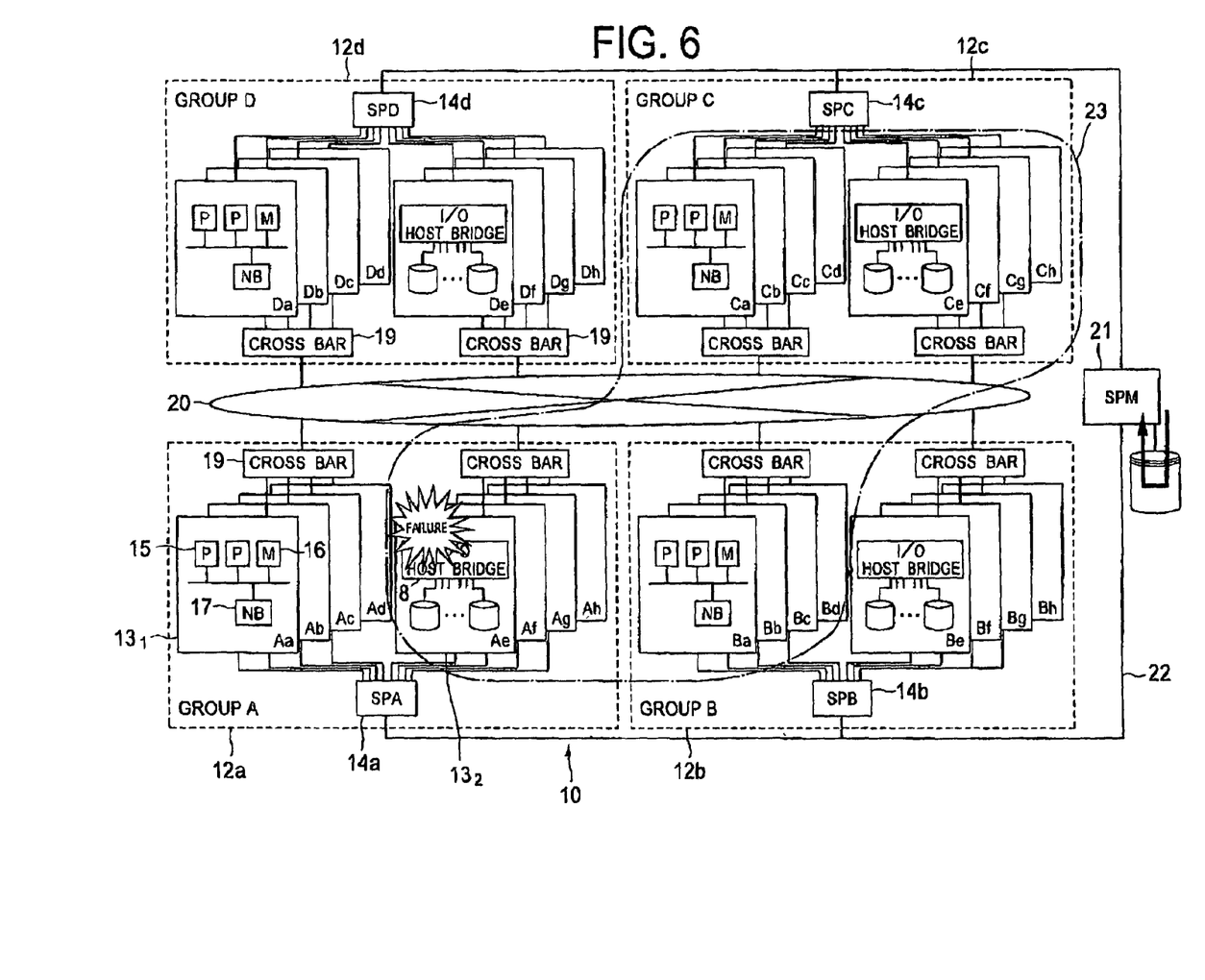
Figure 7:
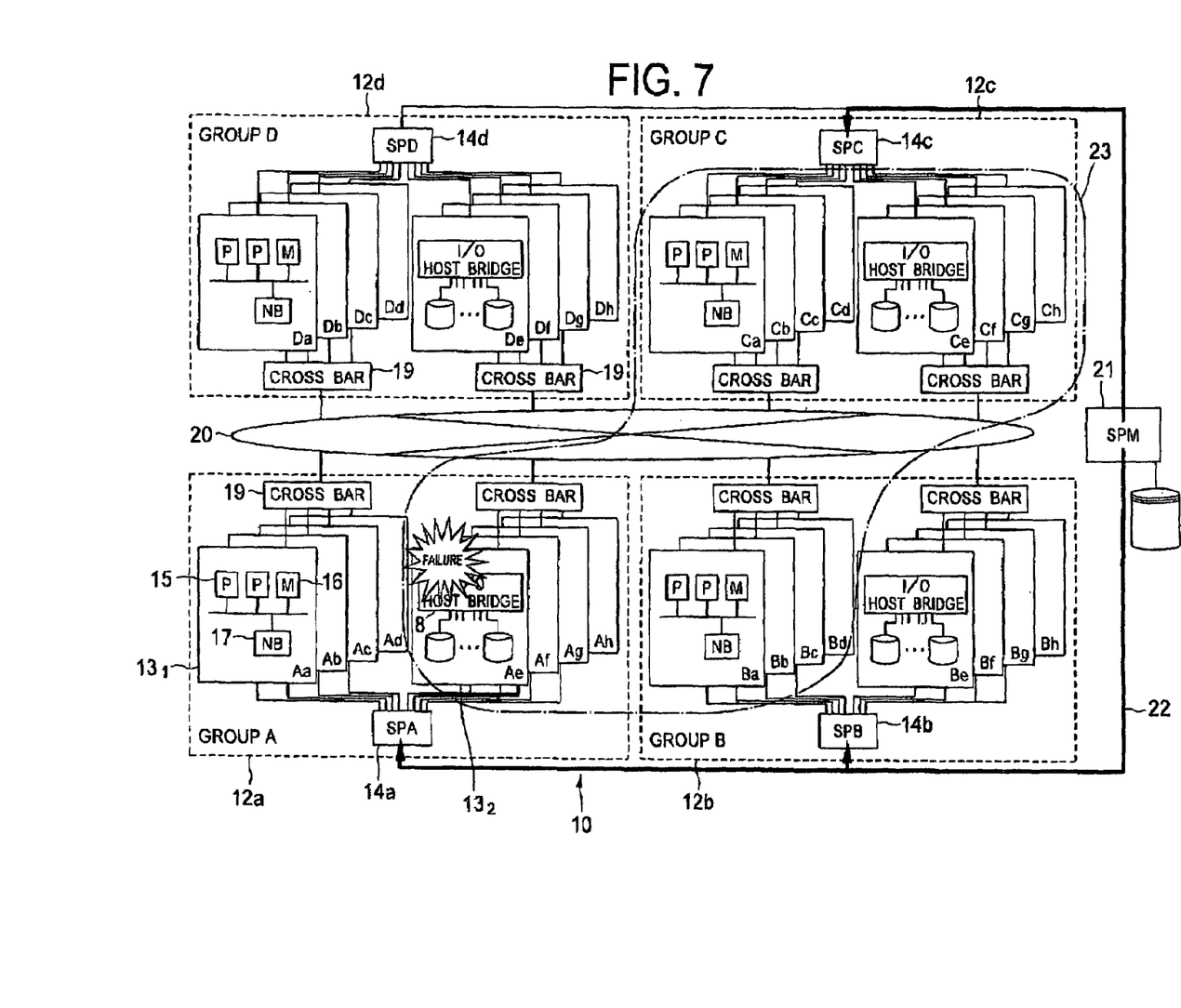
Figure 8:
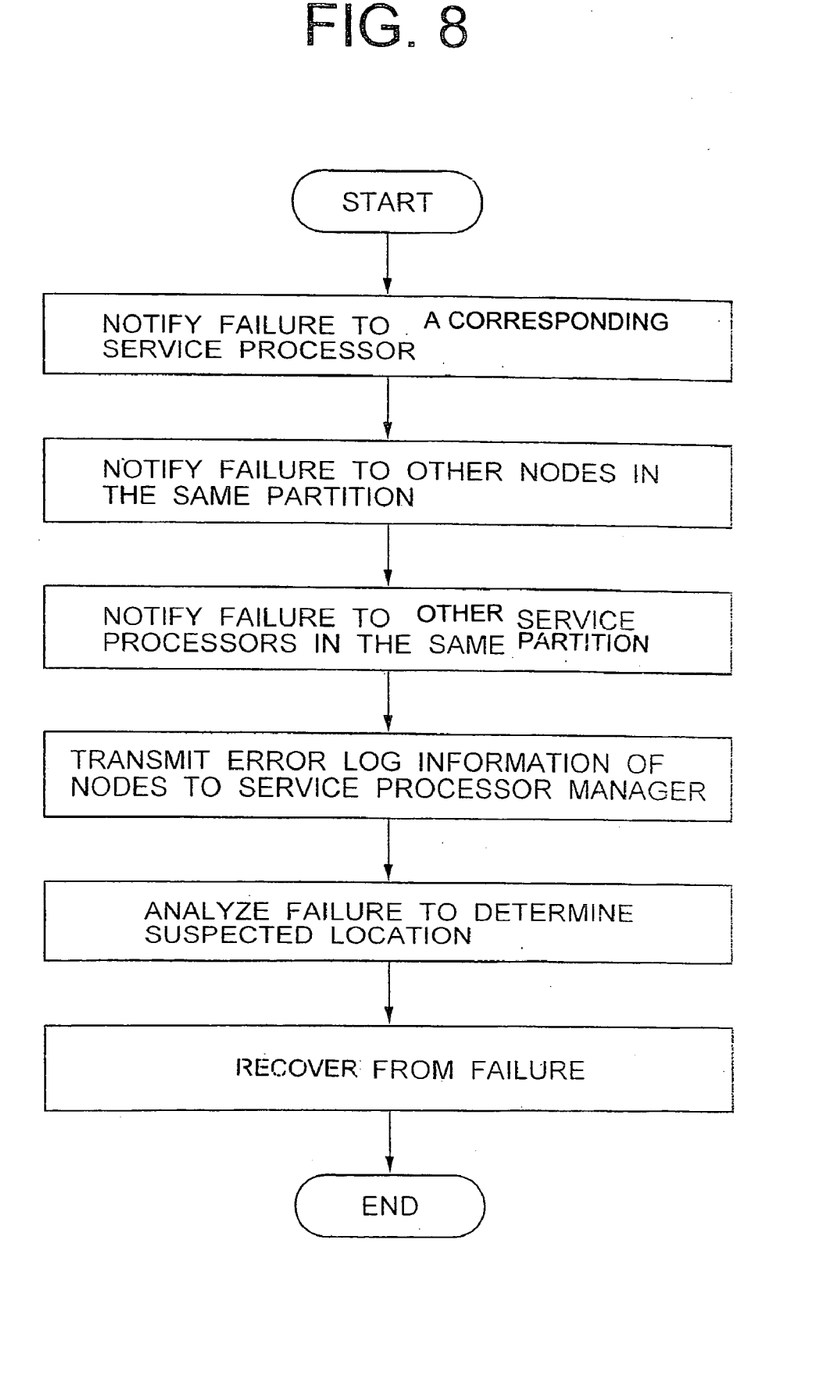
FIG. 8 is a flowchart of the processing for recovering from the failure in the multi-processor system of the present embodiment.
Figure 9:
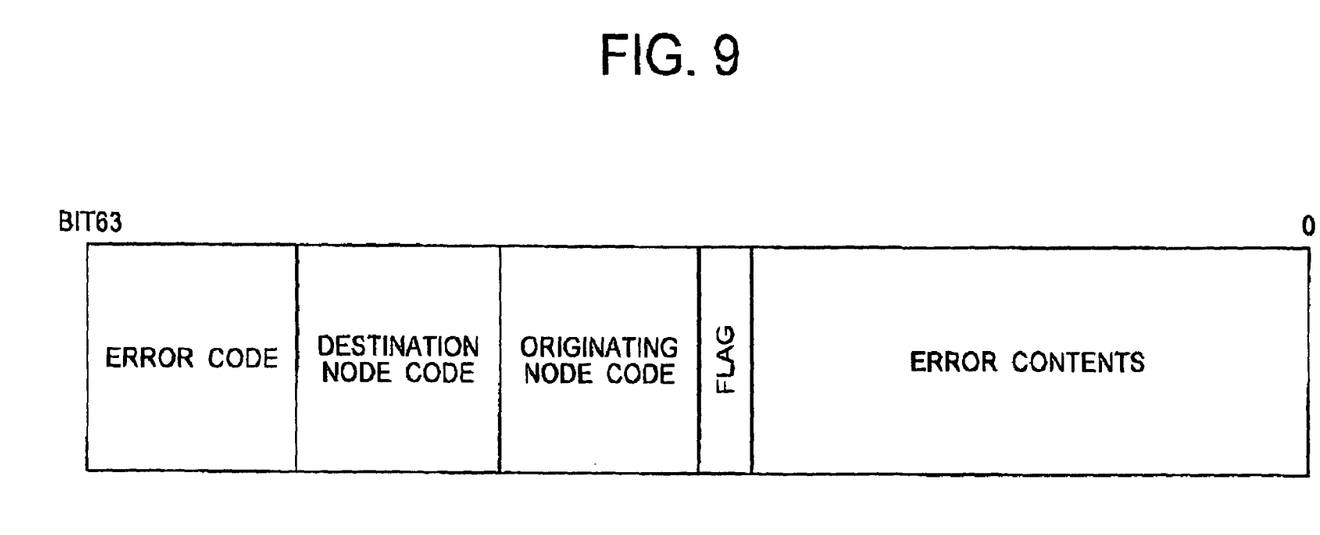
FIG. 9 is a schematic diagram showing exemplified contents of the failure notification packet used in the present embodiment.

An example of the process for recovery from a failure in the above multi-processor system 10 will be described hereinafter with reference to FIGS. 2 to 9, wherein FIGS. 2 to 7 shows first to sixth consecutive steps of the processing as will be described hereinafter, FIG. 8 shows the procedure of the processing and FIG. 9 shows an example of the packet notifying the failure, i.e., failure notification packet. It is assumed in the following description that a node-Ae in node group-A failed due to an ECC error during transferring data from the I/O host bridge 18 in node-Ae, as shown in FIG. 2.

First Step

The first step is such that a failed node notifies the service processor of failure information including information of the occurrence of a failure (FIG. 8).

More specifically, in FIG. 2, node-Ae, after detecting the occurrence of the own failure, holds therein the error log data, i.e., failure information such as internal trace data and register data. Subsequently, node-Ae 13 stops the scheduled data transmission and communicates the occurrence of the failure to the service processor 14a which manages the failed node-Ae 13. The service processor 14a, after receiving the information of occurrence of the failure, analyzes the degree, status and type of the failure based on the error log information, and judges whether it is sufficient to simply isolate the failed node-Ae from the system or it is necessary to reset the partition 23 for recovery from the failure. If the service processor 14a judges that the partition reset is needed, then the service processor 14a immediately resets the failed node-Ae, communicates the occurrence of the failure to the service processor manager 21, and requests the service processor manager 21 to reset the partition.

Second Step

The second step is such that the failed node 13 notifies the other nodes in the same partition 23 of the occurrence of the failure. The second step is conducted concurrently with the first step.

More specifically, the failed node-Ae 13 prepares a failure notification packet for notifying the failure to other nodes 13 of the partition 23. The failure notification packet, as shown in FIG. 9, includes error code, destination node code, originating node code, critical failure flag, and error contents information. The error code indicates that the subject packet is an error notification packet. The destination node code may indicate the destination nodes of the subject packet, and specifies in fact the broadcasting address in this example. The originating node code specifies the address of the failed node-Ae 13, which transmitted the subject error notification packet. The critical failure flag indicates whether or not the failure of node-Ae 13 is critical, and since node-Ae 13 has a critical failure in this example, the critical failure flag is set. The error contents information includes the contents of the failure in the node-Ae 13.

Figure 3:
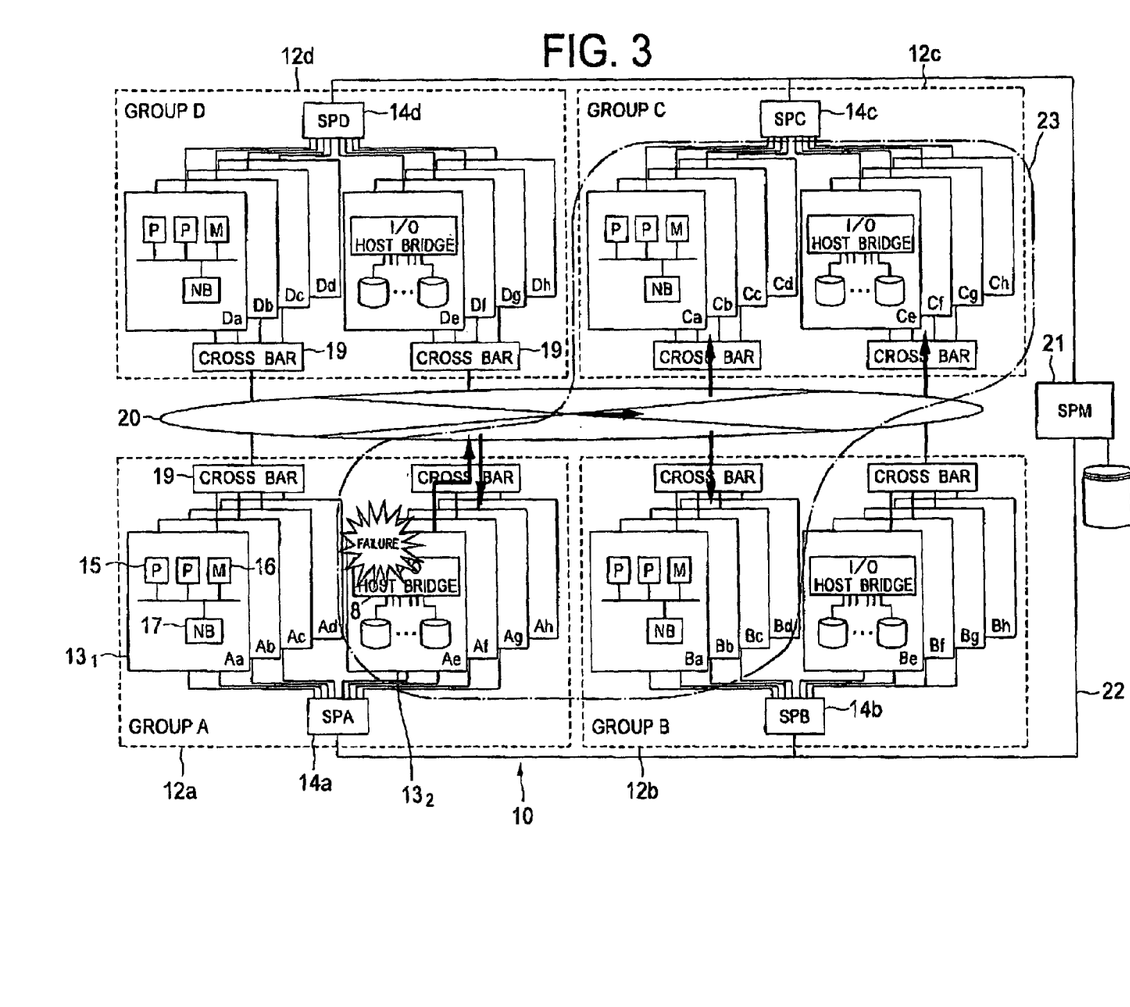

The failure notification packet is transmitted by the broadcasting to all the other nodes in the partition 23 via the network 20, as illustrated in FIG. 3. The failure notification packet is transmitted by using a channel different from the channels used for ordinary transactions. This allows the failure notification packet to be transmitted at a higher speed without fail, even if there is congestion or degradation of performances in the channels used for the ordinary transactions.

Each node 13 which received the failure notification packet judges whether or not the failed node-Ae 13 belongs to the same partition to which the each node 13 belongs, based on the partition information stored in the corresponding nose bridge 17 or I/O host bridge 18. The each node 13 fetches and stores therein the failure notification packet as a part of the error log information of the own node, if the failed node-Ae 13 belongs to the same partition 23 to which the each node 13 belongs. Thus, each of node-Af to node-Ah, node-Ba to node-Bd and node-Ca to node Ch stores therein the failure notification packet as a part of the error log information of the own node.

Third Step

The third step is such that the nodes belonging to the same partition 23 to which the failed node-Ac 13 belongs notify the failure information to the respective service processors 14 managing the nodes 13.

Figure 4:
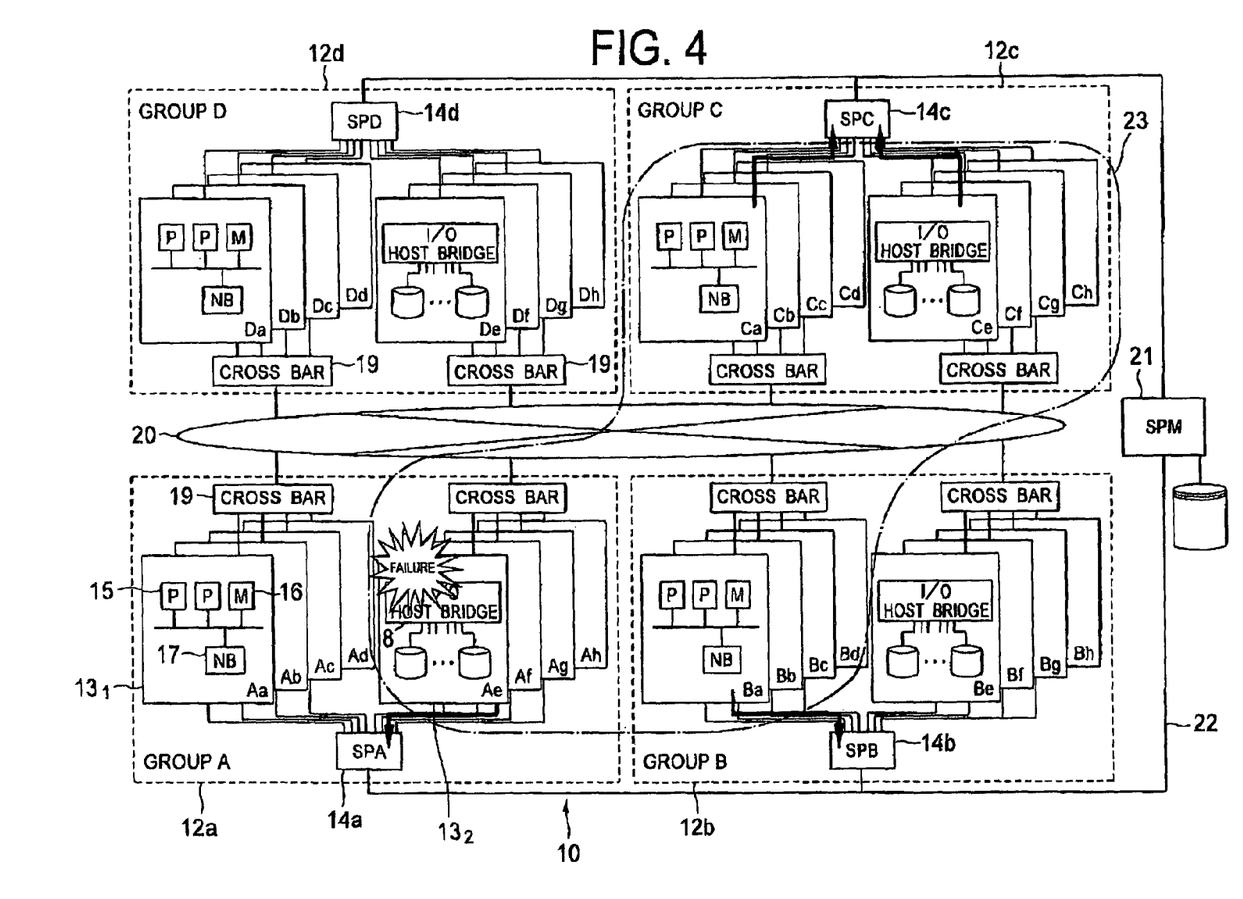

More specifically, as shown in FIG. 4, each of node-Af to node-Ah, node-Ba to node-Bd and node-Ca to node Ch belonging to the same partition 23 and storing therein the failure notification packet as a part of the error log information of the own node recognizes the contents of the failure notification packet. If the critical failure flag is set in the packet, then each of these nodes 13 holds and stores therein the error log information of the own node, and notifies the corresponding service processor 14 of the occurrence of the failure.

Each of the service processors 14 receiving the error log information of the nodes subordinate thereto, analyzes the error log information of the respective nodes, and resets the respective nodes based contents of the failure notification packet.

Fourth Step

The fourth step is such that the service processors 14 controlling the other nodes 13 belonging to the same partition to which the failed node-Ae belongs notify the service processor manager 21 of the contents of the failure of the subordinate nodes.

Figure 5:
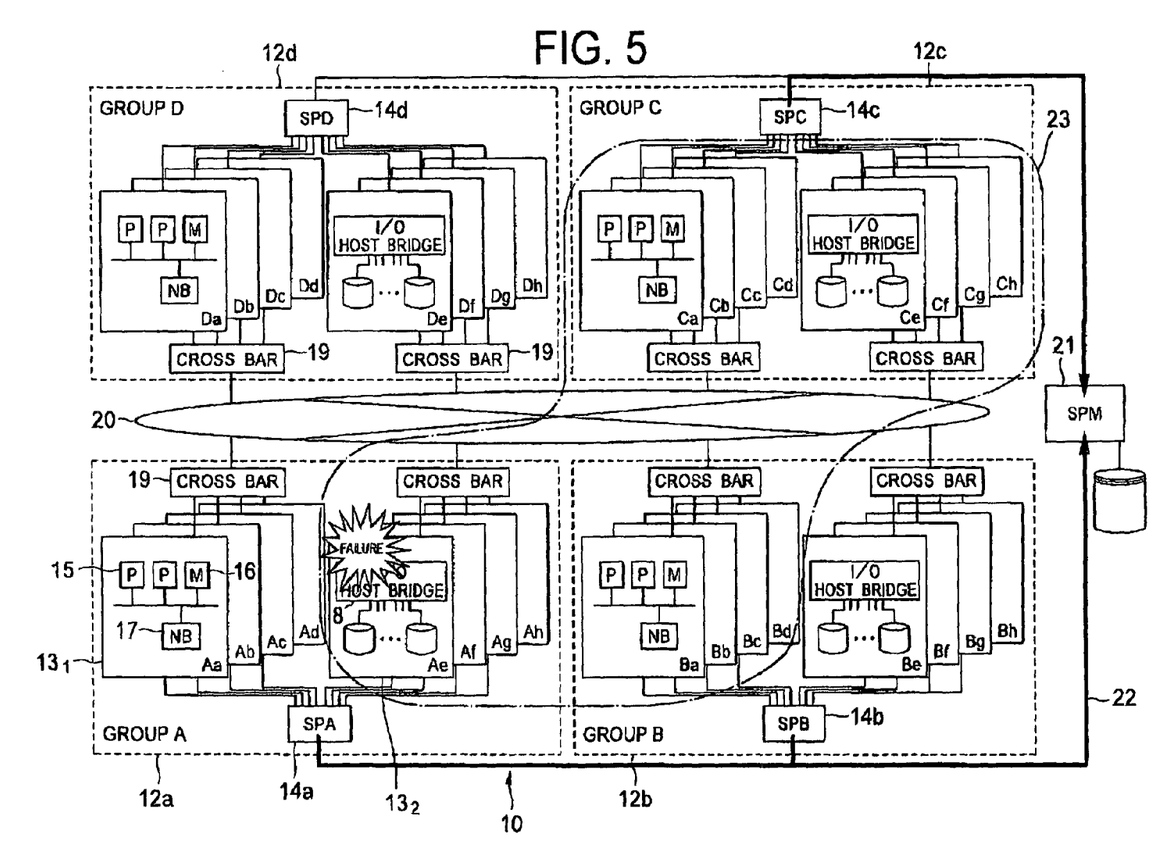

More specifically, as shown in FIG. 5, each of the service processors 14 which received the notification of the occurrence of the failure transmits the error log information of the nodes controlled by the each of the service processors to the service processor manager 21.

Fifth Step

The fifth step is such that the service processor manager 21 analyzes the degree, status and contents of the failure and identifies the suspected location of the failure.

More specifically, as shown in FIG. 6, the service processor manager 21 which received the error log information from the service processors 14 analyzes the error log information of the respective service processors 14, and judges based thereon that the failure is caused by a single failure based on the fact that received failure notification packets specify a single location of the failure. The service processor manager 21 then identifies the suspected failed location by using the failure analysis dictionary provided in the service processor manager 21. Parallel to the identification of the suspected failed location, the service processor manager 21 manages the log information by combining the received failure information with the system configuration information such as logic permission information and physical location information.

Sixth Step

The sixth step is such that recovery from the failure is achieved.

More specifically, as shown in FIG. 7, if the service processor manager 21 judges that a partition reset is needed, the service processor manager 21 indicates the service processors 14a, 14b and 14c in the partition 23 to reset the partition 23. The service processors 14a, 14b and 14c perform the partition reset in synchrony with one another. In an alternative, the service processor manager 21 may deliver a set of sequential signals to control the service processors 14a, 14b and 14c in a complete subordinate control.

Any practical technique for recovery from the failure may be used depending on the status and/or contents of the failure among a plurality of known techniques for the recovery. For example, under a mission-critical operation, it is usual that the service processor manager 21 is connected to a maintenance center (not shown) for assisting the service processor manager 21 to recover from the failure by the maintenance center. The maintenance personnel in the maintenance center receives the failure information from the remote service processor manager, and quickly and assuredly replaces the failed part or parts of the failed node by new part or parts with a minimum loss time based on the received failure information.

In the above procedure, if redundant resources for replacing the failed node are provided in the system, the redundant resource may be incorporated in the partition upon the partition reset. This allows obviation of insufficient resources to thereby prevent the system from operating with an undesirable higher load.

In addition, if the operating system has an enhanced RAS function, and if the recovery from the failure can be achieved simply by isolation of the failed node, then the redundant resource may be incorporated in the system instead of the failed node without the partition reset This achieves a robustness of the system.

In the above embodiment, the failed node can be quickly identified with accuracy in the large-scale multi-processor system, whereby the failure can be quickly and accurately removed is without extending to other partitions. The present invention allows a large-scale open multi-processor system to be applied to a mission critical field. In the above embodiment, the broadcasting notification of the failed node without reciting destinations alleviates the burden of the failed node.

In a modification from the above embodiment, the failed node may transmit the failure notification packet in the second step only to the nodes belonging to the same partition to which the failed node belongs. In such a case, the column for reciting the destination node of the failure notification packet includes the addresses of the nodes belonging to the same partition to which the failed node belongs. The transmission of the failure notification packet to the other nodes belonging to the same partition obviates the need of affirmation by the other nodes receiving the failure notification packet, thereby allowing the other nodes to immediately start the necessary steps. In addition, the amount of data transmission can be reduced to assist the system to quickly recover from the failure. Use of the channel in the network different from the channels used for ordinary transactions allows quick and assured transmission of the failure notification packet.

It is to be noted that the second step in the embodiment, wherein the notification of the failure to the nodes belonging to the same node group to which the failed node belongs, may be replaced by using a return packet from the corresponding service processor 14 or from the corresponding cross bar 19.

Since the above embodiments are described only for examples, the present invention is not limited to the above embodiments and various modifications or alterations can be easily made therefrom by those skilled in the art without departing from the scope of the present invention.

What is claimed is:

1. A multi-processor system comprising: a plurality of node groups each including a plurality of nodes and a service processor for managing said plurality of nodes; a service processor manager for managing said service processors of said plurality of node groups; a network for interconnecting said plurality of nodes of said plurality of node groups, and a partition including a selected number of nodes selected from said plurality of nodes of said plurality of node groups, wherein:
   a failed node among said selected number of nodes transmits failure information including occurrence of a failure to a corresponding service processor, which prepares first status information of said failed node based on error log information of said failed node and transmits said first status information to said service processor manager;
   said failed node transmits failure notification data including said failure information to other nodes of said selected number of nodes;
   said other nodes transmit said failure information to respective said service processors, which prepare second status information based on error log information of said other nodes and transmit said second status information to said service processor manager; and
   said service processor manager identifies a location of said failed node based on said first and second status information to indicate said service processors in said partition to recover from said failure.

2. The multi-processor system according to claim 1, wherein said failed node transmits a failure notification packet including said failure notification data to said other nodes through said network.

3. The multi-processor system according to claim 2, wherein said failure notification packet has destination addresses specifying said other nodes.

4. The multi-processor system according to claim 2, wherein said failure notification packet is transmitted by broadcasting to said plurality of nodes of said plurality of node groups, and said other nodes of said selected number of nodes fetch therein said failure notification packet based on partition information of said failed node.

5. The multi-processor system according to claim 2, wherein said failed node transmits said failure information through a communication channel different from a communication channel used for an ordinary transaction.

6. The multi-processor system according to claim 1, wherein said service processors and said service processor manager are connected together via a dedicated communication line.

7. The multi-processor system according to claim 1, wherein if said corresponding service processor judges that said failure is a minor error, said corresponding service processor isolates said failed node from said partition.

8. The multi-processor system according to claim 1, wherein said service processor manager indicates said service processors in said partition to reset said partition in synchrony with one another.

9. A method for recovering from a failure in a multi-processor system including: a plurality of node groups each including a plurality of nodes and a service processor for managing said plurality of nodes; a service processor manager for managing said service processors of said plurality of node groups; a network for interconnecting said plurality of nodes of said plurality of node groups, and a partition including a selected number of nodes selected from said plurality of nodes of said plurality of node groups, said method comprising the steps of:
   transmitting failure information including occurrence of a failure from a failed node among said selected number of nodes to a corresponding service processor, thereby allowing said corresponding service processor to prepare first status information of said failed node based on error log information of said failed node and transmit said first status information to said service processor manager;
   transmitting failure notification data including said failure information from said failed node to other nodes of said selected number of nodes;
   transmitting said failure information from said other nodes to respective said service processors, thereby allowing said service processors to prepare second status information based on error log information of said other nodes and transmit said second status information to said service processor manager; and
   allowing said service processor manager to identify a location of said failed node based on said first and second status information and indicate said service processors in said partition to recover from said failure.

* * * * *